Feb. 18, 1958 J. W. GRATIAN 2,824,229

DIRECT CURRENT POTENTIAL GENERATOR

Filed May 11, 1951

INVENTOR.
JOSEPH W. GRATIAN
BY T. L. Bowes
ATTORNEY 2,824,229
Patented Feb. 18, 1958

2,824,229

DIRECT CURRENT POTENTIAL GENERATOR

Joseph W. Gratian, Rochester, N. Y., assignor, by mesne assignments, to General Dynamics Corporation, a corporation of Delaware Application May 11, 1951, Serial No. 225,784

3 Claims. (Cl. 250—36)

Figure 1A:
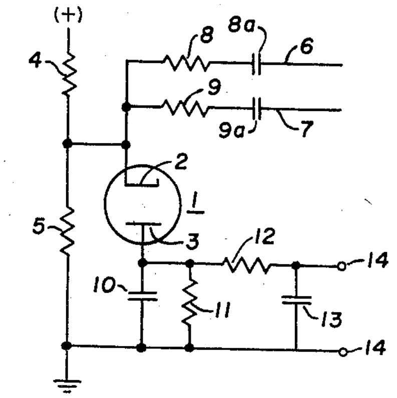

My present invention relates to means for developing a direct current potential and more particularly to means for developing a negative direct current bias for controlling the frequency of a multivibrator.

A generator of a direct current potential of predetermined polarity is useful in many applications. For example, multivibrators are used for many purposes, and in connection therewith, a source of reference or timing pulses may be employed in conjunction with the output of the multivibrator to monitor the output frequency. For this purpose a direct current bias having a value determined by some electrical characteristic may be employed to control the frequency of the multivibrator. With this arrangement I contemplate the use of the potential generator made in accordance with the principles of my invention for this purpose.

For another example, a frequency multiplier having a frequency which is an integral multiple of some reference or timing source, the reference or timing source being subject to drift, may be desired. For example, there may be a variation in the system supply voltage. Multiplication may be obtained from a multivibrator having a natural frequency approximately equal to the desired multiple of the reference frequency. Conventional synchronization of the multivibrators is not always sufficient because a difference between the reference frequency and the natural frequency of the multivibrator results in loss of synchronization or non-uniformly spaced pulses. For example, if a multiplication of six is desired and the free running multivibrator frequency divided by the factor of six should be, for example, ten percent lower than the reference frequency, the output consists of five uniform intervals followed by a sixth interval approximately one-half narrower than the preceding intervals. It is desired in such cases, where the reference frequency may drift or vary, that means be provided for assuring that the interval between successive reference pulses be divided into the desired number of evenly or uniformly spaced intervals. In accordance with the principles of my invention there is provided a searching type of system which limits the possible error. The advantage of my system is that the limits of error are relatively independent of the difference between the reference frequency and the frequency of the free running multiplying multivibrator.

Accordingly, it is an object of my invention to provide a new and improved means for developing a direct current potential.

Another object of my invention is to provide a new and improved frequency multiplier.

Still another object of my invention is to provide a new and improved frequency multiplier having means for minimizing hunting or variation of frequency in cases where the source of supply may be subject to drift; that is, where the source to be multiplied is subject to variation.

It is still another object of my invention to provide a new and improved multivibrator arrangement having new and improved means for controlling the output frequency thereof.

Figure 1B:
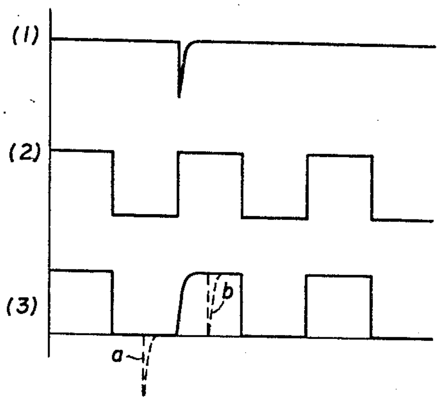
Figure 2:
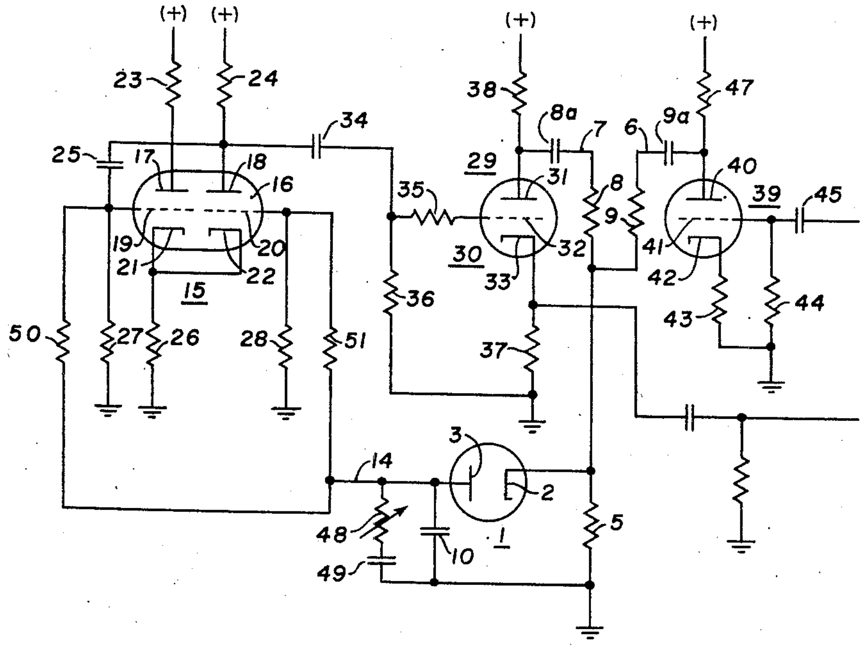

The foregoing objects of my invention are accomplished in one form of my invention by providing a unilateral device such as a diode, a source of reference pulses which may be subject to variation in frequency, and a source of square wave pulses, preferably the output of a multivibrator. In the preferred embodiment of my invention, the square wave output of the multivibrator and the reference pulses are applied to the cathode of the diode and are employed to charge a capacitor connected to an output circuit including the capacitor and the anode of the diode. With such an arrangement the periodic appearance of the reference pulses modifies the charge on the capacitor and the resulting average potential appearing across the capacitor depends upon the relative time positions of the pulses and the square waves. Filtering means may be provided across the output capacitor in order to smooth out the potential variations across the capacitor. The output may constitute a direct current bias for the electron discharge devices employed in the multivibrator circuit. Other objects and advantages of my present invention will become apparent from the following specification taken in conjunction with the drawing wherein Fig. 1A is a circuit arrangement of a direct current potential generator embodying the principles of my invention. Fig. 1B is a chart useful in understanding the operation of the arrangement shown in Fig. 1A and Fig. 2 shows a circuit diagram of a multivibrator employing the pulse generator of Fig. 1A in a frequency controlling function.

Referring to Fig. 1A there is shown a diode 1 having a cathode 2 and an anode 3. The cathode 2 is connected to a suitable source of positive potential through a suitable resistor 4 and to ground through a suitable resistor 5.

An input circuit is connected to cathode 2 and comprises a source of reference pulses indicated by the numeral 6 and a source of square wave indicated by the numeral 7. The source of reference pulses 6 is connected to cathode 2 through a suitable resistor 8 and coupling capacitor 8*a* and the source of square wave 7 is connected to cathode 2 through a suitable resistor 9 and coupling capacitor 9*a*. Whereas there is illustrated a diode 1 it is understood that any suitable unilateral device may be used in its place. The anode 3 is provided with an output circuit constituting a suitable capacitor 10 connected between anode 3 and ground.

The source of potential applied to cathode 2 is of such value that the diode 1 is normally rendered nonconducting but the appearance of square waves of a predetermined relative negative polarity on lead source 7 renders conducting the diode 1. In this manner there are utilized the square waves and the unilateral device for charging capacitor 10. The reference pulses from lead 6 are utilized to modify the charging of capacitor 10 whereby the amplitude of the potential across capacitor 10 is dependent upon the relative time positions of the reference pulses and the square wave.

The foregoing operation may be made clear from a study of Fig. 1B wherein at (1) is represented the reference pulse wave and at (2) is represented the square wave. At (3) there are represented several possible conditions of relative time positions between the reference pulses and the square wave. If it is assumed that the reference pulse shown at (1) appears at time position indicated by dashed pulse *a*, it will be understood by those skilled in the art that diode 1 having been rendered conductive by the appearance of the relatively negative square wave pulse, capacitor 10 is charged to a greater degree by the appearance of the relatively negative reference pulse. If on the other hand the reference pulse appears during the time of the relatively positive portion of the square wave as indicated by the dashed pulse *b*, the reference pulse can have no effect upon the charge on capacitor 10 because diode 1 is clearly non-conducting, both because of the relative polarity of the square wave at that instant and also because of the normally positive bias applied to the cathode 2. Thus, it is seen that the average potential appearing across capacitor 10 depends somewhat upon the time position of the reference pulses as compared to the relatively negative portions of the square wave. The amount of modification of the average charge upon capacitor 10 depends upon the relative time positions of the reference pulses and the square waves.

Means is provided for filtering the output potential appearing across capacitor 10. In the arrangement shown in Fig. 1A, the filtering means comprises resistors 11 and 12 and capacitor 13. Filtered output pulses appear at terminals 14.

Reference is now made to Fig. 2 wherein there is disclosed an application of the arrangement shown in Fig. 1A. In Fig. 2 there is represented generally by the numeral 15 a multivibrator of the free running type. Included in multivibrator 15 is an electron discharge device 16 illustrated as being of the double-triode type having anodes 17 and 18, control electrodes or grids 19 and 20 and cathodes 21 and 22, respectively. While there is illustrated an electron discharge device or tube of the double-triode type, it should be understood that separate discharge devices may be employed if desired and any desired number of elements may be provided. Anode 17 is connected to a suitable source of positive potential through a resistor 23 and anode 18 is connected to a suitable source of positive potential through a suitable resistor 24. Anode 18 is also connected to grid or control electrode 19 through a suitable capacitor 25. The cathodes are connected together and then to ground through a suitable resistor 26. Grids 19 and 20 are connected to ground through suitable grid resistors 27 and 28, respectively.

The output pulses appearing at anode 18 of the multivibrator 15 are suitably amplified in clipper-amplifier 29 which comprises a suitable electron discharge device such as the triode 30 and including anode 31, grid or control electrode 32 and cathode 33. The anode 18 of discharge device 16 is connected to grid 32 by means of a suitable coupling capacitor 34 and resistor 35. Grid 32 is connected to ground through resistor 35 and a suitable grid resistor 36. Cathode 33 is connected to ground through cathode resistor 37. Anode 31 is connected to a suitable source of positive potential through a suitable resistor 38.

Means is provided for developing a negative direct current bias for controlling the frequency of cycling of multivibrator 15. Basically, this means comprises the circuit shown in Fig. 1A. Thus, the output of the discharge device 30, corresponding to the square wave (2) of Fig. 1B, is connected to the cathode 2 of diode 1 through coupling capacitor 8*a* and resistor 8.

Fig. 2 also shows a source of reference pulses suitable for providing the reference pulses shown at (1) of Fig. 1B. For this purpose there is provided a suitable electron discharge device 39 which may be a triode as shown in Fig. 2 including an anode 40, a control electrode or grid 41 and a cathode 42. Cathode 42 is connected to ground through a suitable cathode resistor 43. Control electrode 41 is connected to ground through a suitable grid resistor 44. A suitable source of timing pulses is connected to grid 41 of discharge device 39 through a suitable coupling capacitor 45.

The output pulses appearing at anode 40 of discharge device 39 are connected to cathode 2 of diode 1 through suitable coupling capacitor 9*a* and resistor 9. It is also noted that anode 40 is connected to a suitable source of positive potential through a suitable resistor 47.

In the arrangement shown in Fig. 2 means is provided for minimizing the hunting of the frequency of multivibrator 15. For this purpose there is illustrated a variable resistor 48 connected in series with a suitable capacitor 49 across or in shunt with output capacitor 10 of the diode gate. The output of the diode gate is connected to grids 19 and 20 by means of suitable resistors 50 and 51, respectively.

With the arrangement shown in Fig. 2, let it be understood that the anode potential is applied to the circuit. At the instant of the application of anode potential there is no charge upon capacitor 25 and the control electrodes of both sections of discharge device 16 are at ground potential. When the anode potential is applied both sections of the discharge device 16 tend to conduct current therethrough. Since the anode current of both sections flows through the cathode resistor 26, the potentials of cathodes 21 and 22 rise above ground. Thus, there results a bias voltage or potential which tends to limit the amount or amplitude of current flowing through both sections of discharge device 16. The flow of anode current through resistor 24 tends to reduce the voltage at the anode 18 of the right hand section of tube 16 and, since the potential across capacitor 25 cannot change instantaneously, there results a drop in voltage at the control electrode 19, which tends further to reduce the current flowing through the left hand section of discharge device 16. This reduction of current decreases the amplitude of the voltage developed across resistor 26 which results in an increase in the flow of anode current through the right hand portion of discharge device 16. The resulting increased current causes the potential at anode 18 to drop still further and conduction through the left hand section of discharge device 16 is decreased even further. This action being cumulative, conduction through the left hand section of discharge device 16 is finally cut-off completely and the current through the right hand section 16 reaches a maximum. Thus, the left hand section of discharge device 16 is almost instantaneously driven beyond cut-off and is held beyond cut-off during the time that capacitor 25 discharges through resistor 27, the right hand section of discharge device 16 and resistor 26. The discharge current through resistor 27 produces a voltage at grid 19 which is negative with respect to ground and which decreases exponentially as capacitor 25 discharges. When the voltage at grid 19 reaches cut-off, the left hand section of discharge device 16 begins to conduct and the current drawn through the left hand section also flows through resistor 26, resulting in an increased voltage thereacross. This increased voltage renders the bias on the right hand section of discharge device 16 more negative so that less anode current flows through the right hand section and, as a result of the decrease of anode current through the right hand section, the voltage at anode 18 increases. Since the potential across capacitor 25 cannot change instantaneously, the potential at grid 19 becomes more positive, thereby increasing further the anode current through the left hand section of the discharge device 16. This action is also cumulative and almost instantaneously results in the current through the right hand section being reduced to zero and the current through the left hand section being increased to a maximum, at which point the right hand section is cut off by the voltage developed across the cathode resistor 26 when the high anode current flows through the left hand section as a result of the driving of the grid 19 positive.

At the time grid 19 is driven highly positive, causing anode current flowing through the left hand section to be large, the drop across resistor 26 increases quickly. Because grid current is drawn while grid 19 is more positive than the potential across resistor 26, capacitor 25 charges relatively quickly through resistor 26, the cathode-to-grid resistance of the left hand section of discharge device 16 and anode resistor 24. The capacitor 25 has charged sufficiently shortly thereafter such that the potential at grid 19 is reduced to the cathode potential. Since the grid 19 is still positive with respect to ground, the charging of capacitor 25 continues but at a slower rate because when grid current is not drawn, the resistance of the charging path is through resistor 24 and grid resistor 27 which results in a longer time constant than the path through the left hand section of discharge device 16. As capacitor 25 charges, the positive bias at grid 19 decreases, causing the anode current through the left hand section to decrease, which in turn decreases the drop across cathode resistor 26. The grid 20 of discharge device 16 is held constant at ground potential so that the right hand section of discharge device 16 remains cut off as long as the potential across resistor 26 is positive relative to ground but more than the cut-off voltage but when the drop across resistor 26 drops to the cut-off value, the right hand section of discharge device 16 conducts and rapidly cuts off flow of current through the left hand section of the discharge device 16 by establishing a sufficiently large relatively negative potential through capacitor 25 to the grid 19.

The pulses appearing at anode 18, as previously mentioned, are squared and amplified in the clipper-amplifier 29 and applied to the cathode 2 of diode 1, a representation of the output of discharge device 30 being represented in Fig. 1B at (2) as previously indicated.

Referring again to Fig. 2, the combined resistive load, consisting of resistors 50, 27, 28 and 51, should be at least several times the impedance of the sources of square wave and reference pulses which feed the diode gate, i. e., several times the combined impedance of discharge devices 30 and 39 and resistors 8 and 9 and 5. The capacitance of capacitor 49 should be several times the capacitance of capacitor 10 for best results. The resistance of resistor 48 is intermediate between the diode gate source and load impedances and is adjusted for minimum hunting.

Resistor 48 and capacitor 49 act to reduce hunting of the multivibrator output frequency in the following manner. A considerable change in bias follows immediately upon the conduction of a single reference pulse through the diode gate 1. This change in bias acts to reduce the time required for the multivibrator 15 to trigger in the reverse direction and so to bring the reference pulse and the trailing edge of the negative going portion of the square wave into coincidence on succeeding cycles. Following the pulse, however, capacitor 10 discharges rapidly into capacitor 49 so that before the multivibrator completes one cycle its frequency has returned to some value only slightly higher than that which prevailed before compensation was demanded. Capacitors 49 and 10 then continue to discharge slowly through the high resistance load for the remainder of the reference period. This arrangement, therefore, acts to provide compensation when required through a more or less instantaneous shift in the phase of the multivibrator as well as some net shift in frequency but without the excessive cumulative frequency shift which results in excessive hunting.

In one embodiment of my invention, discharge device 16 comprised a type 12AX7 tube, a second type 12AX7 tube was used to provide discharge means 30 and 39 and diode 1 was of the 1N34 type. The values of various components were as follows:

| | | |
|---|---|---|
| Capacitor **8a** | microfarads | .25 |
| Capacitor **9a** | do | .1 |
| Capacitor **10** | do | .5 |
| Capacitor **25** | do | .004 |
| Capacitor **34** | do | .022 |
| Capacitor **45** | micromicrofarads | .900 |
| Capacitor **49** | microfarads | 2 to 5 |
| Resistor **5** | ohms | 56,000 |
| Resistor **8** | megohms | 0.1 |
| Resistor **9** | ohms | 56,000 |
| Resistor **23** | do | 100 |
| Resistor **24** | do | 100 |
| Resistor **26** | do | 1000 |
| Resistor **27** | megohms | 0.4 to 1 |
| Resistor **28** | do | 0.4 to 1 |
| Resistor **35** | do | 1.0 |
| Resistor **36** | do | 1.0 |
| Resistor **37** | ohms | 2,200 |
| Resistor **38** | do | 56,000 |
| Resistor **43** | do | 4,700 |
| Resistor **44** | megohms | 0.39 |
| Resistor **47** | ohms | 56,000 |
| Resistor **48** | megohms | 0.5 |
| Resistor **50** | do | 2.2 |
| Resistor **51** | do | 2.2 |

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. A potential generator comprising a diode having an anode and a cathode, a source of reference pulses, a source of square waves connected to said cathode, an output circuit connected to said anode, said circuit including a capacitor, means for biasing said diode to a normally non-conducting condition, means utilizing said square waves for overcoming said bias and charging said capacitor through said diode, means for applying said reference pulses to said cathode, whereby the average charge of said capacitor is modified by an amount dependent upon the relative time positions of said reference pulses and said square waves, and means for filtering the potential wave appearing in said output circuit.

2. A potential generator comprising a diode having an anode and a cathode, a source of reference pulses, a source of square waves connected to said cathode, an output circuit connected to said anode, said circuit including a capacitor, means for biasing said diode to a normally non-conducting condition, means utilizing said square waves for overcoming said bias and charging said capacitor through said diode, means for applying said reference pulses to said cathode, whereby the average charge of said capacitor is modified by an amount dependent upon the relative time positions of said reference pulses and said square waves, and means for filtering the potential wave appearing in said output circuit, and said filtering means comprising a resistor and a capacitor connected in series across the first-mentioned capacitor.

3. In combination with a multivibrator having a pair of electron discharge devices, each of which has a control electrode and an output circuit providing substantially square pulses, a source of reference pulses, said source being subject to hunting, means for developing a direct current bias for said control electrodes, the amplitude of which is dependent upon the relative time positions of said reference pulses and said square pulses, said means comprising a diode having an anode and a cathode, means for biasing said diode to a normally nonconducting condition, means for connecting said source to said cathode, a capacitor connected to said cathode as the output for said diode, means utilizing said square pulses for overcoming said bias and charging said capacitor through said diode, means for applying said reference pulses to said cathode, whereby the average charge of said capacitor is modified by an amount dependent upon the relative time positions of said reference pulses and said square pulses, and means for minimizing variations in the output frequency of said multivibrator due to variations in the frequency of said reference pulses, said means comprising a resistor and a capacitor connected in series across the first-mentioned capacitor.

(References on following page)

References Cited in the file of this patent

UNITED STATES PATENTS

| | | |
|---|---|---|
| 2,390,608 | Miller et al. | Dec. 11, 1945 |
| 2,392,114 | Bartelink | Jan. 1, 1946 |
| 2,400,648 | Korman | May 21, 1946 |
| 2,535,912 | Frank et al. | Dec. 26, 1950 |
| 2,541,259 | Maggio | Feb. 13, 1951 |
| 2,580,771 | Harper | Jan. 1, 1952 |
| 2,643,330 | Borgeson | June 23, 1953 |

FOREIGN PATENTS

| | | |
|---|---|---|
| 582,095 | Great Britain | Dec. 14, 1944 |

U. S. DEPARTMENT OF COMMERCE

PATENT OFFICE

CERTIFICATE OF CORRECTION

Patent No. 2,824,229 February 18, 1958

Joseph W. Gratian

It is hereby certified that error appears in the printed specification of the above numbered patent requiring correction and that the said Letters Patent should read as corrected below.

Column 5, line 68, for ".900" read -- 900 --; column 6, line 46, before "said" strike out -- and --.

Signed and sealed this 8th day of April 1958.

(SEAL)

Attest:

KARL H. AXLINE

Attesting Officer

ROBERT C. WATSON

Commissioner of Patents